United States Patent [19]

Matsko et al.

[11] Patent Number: 5,936,817
[45] Date of Patent: Aug. 10, 1999

[54] ELECTRICAL SWITCHING APPARATUS EMPLOYING A CIRCUIT FOR SELECTIVELY ENABLING AND DISABLING A CLOSE ACTUATOR MECHANISM

[75] Inventors: Joseph J. Matsko, Beaver, Pa.; Robert Yanniello, Adren, N.C.

[73] Assignee: Eaton Corporation, Cleveland, Ohio

[21] Appl. No.: 09/075,961

[22] Filed: May 11, 1998

[51] Int. Cl.$^6$ .................................................. H01H 77/00
[52] U.S. Cl. ............................................. 361/72; 361/93
[58] Field of Search ................................ 361/59, 71, 72, 361/73, 74, 75, 93, 96, 97

[56] References Cited

U.S. PATENT DOCUMENTS

| | | | |
|---|---|---|---|
| 4,751,606 | 6/1988 | Matsko et al. | 361/93 |
| 5,270,898 | 12/1993 | Elms et al. | 361/96 |
| 5,341,191 | 8/1994 | Crookston et al. | 335/16 |
| 5,357,394 | 10/1994 | Piney | 361/72 |
| 5,420,799 | 5/1995 | Peterson et al. | 364/483 |
| 5,600,527 | 2/1997 | Engel et al. | 361/93 |

*Primary Examiner*—Sally C. Medley
*Attorney, Agent, or Firm*—Martin J. Moran

[57] ABSTRACT

A circuit breaker includes separable contacts for movement between a closed position and an open position, and an operating mechanism for moving the separable contacts between the closed and open positions. Current transformers and potential transformers sense current, voltage and frequency conditions of the separable contacts and produce signals corresponding to those electrical conditions. A trip unit employs those signals corresponding to the electrical conditions to produce a trip signal. A trip coil employs the trip signal to actuate the operating mechanism to move the separable contacts to the open position. A closing mechanism produces a close signal, and a close actuator mechanism employs the close signal to actuate the operating mechanism to move the separable contacts to the closed position. The trip unit includes a microprocessor-based firmware routine for selectively enabling and disabling the close actuator mechanism as a function of the signals corresponding to the electrical conditions.

21 Claims, 7 Drawing Sheets

ELECTRICAL SWITCHING APPARATUS EMPLOYING A CIRCUIT FOR SELECTIVELY ENABLING AND DISABLING A CLOSE ACTUATOR MECHANISM

BACKGROUND OF THE INVENTION

1. Field of the Invention

This invention is directed to electrical switching apparatus and, more particularly, to circuit interrupters, such as a circuit breakers, which employ closing mechanisms.

2. Background Information

Electrical switching apparatus include, for example, circuit switching devices and circuit interrupters, such as circuit breakers, network protectors, disconnects and transfer switches. Circuit breakers are generally old and well known in the art. An example of a circuit breaker is disclosed in U.S. Pat. No. 5,341,191. Circuit breakers are used to protect electrical circuitry from damage due to an overcurrent condition, such as an overload condition or a relatively high level short circuit or fault condition.

Molded case circuit breakers include a pair of separable contacts per phase which may be operated either manually by way of a handle disposed on the outside of the case or automatically in response to an overcurrent condition. Typically, such circuit breakers include an operating mechanism, which is designed to rapidly open and close the separable contacts, and a trip mechanism, which senses overcurrent conditions in an automatic mode of operation. Upon sensing an overcurrent condition, the trip mechanism trips the operating mechanism to a trip state which moves the separable contacts to their open position.

Some trip mechanisms employ a microprocessor to detect various types of overcurrent trip conditions, such as, for example, a long delay trip, a short delay trip, an instantaneous trip, or a ground fault trip. Other trip mechanisms detect a wide variety of trip conditions and alarm conditions based on line voltage, frequency, phasing or power.

It is known to receive a remotely generated command from a communication network to close the circuit interrupter's separable contacts. It is also known to employ a remote contact or push button to provide a remote command to close the separable contacts. The microprocessor of the circuit interrupter employs the remote close command, along with a signal which confirms the open state of the separable contacts, and produces a close signal which energizes a close actuator, such as a close relay. The close relay, in turn, drives the operating mechanism to close the separable contacts. See, for example, U.S. Pat. No. 4,751,606.

In some circuit interrupters, the trip mechanism employs a trip actuator, such as a shunt trip coil, which is energized and latched in response to a trip condition. Then, in order to close the separable contacts, the user must locally reset the circuit interrupter to deenergize and unlatch the shunt trip coil.

As this requires that a user must locally reset the circuit interrupter before the remote close command is issued, there is room for improvement in electrical switching apparatus which employ closing mechanisms.

SUMMARY OF THE INVENTION

This need and others are satisfied by the invention, which is directed to an electrical switching apparatus including tripping means which produces a trip signal, and closing means which produces a close signal. A close actuator means employs the close signal to actuate operating means and move separable contact means to its closed position. The tripping means includes means for selectively enabling and disabling the close actuator means as a function of at least one signal corresponding to at least one electrical condition of the separable contact means. In this manner, the close actuator means may be advantageously enabled or disabled based upon the electrical condition of the separable contact means.

The electrical switching apparatus comprises separable contact means for movement between a closed position and an open position, and operating means to move the separable contact means between the closed and open positions. A sensing means senses at least one electrical condition of the separable contact means and produces at least one signal corresponding to the at least one electrical condition. A tripping means employs the at least one signal corresponding to the at least one electrical condition to produce a trip signal. A trip actuator means employs the trip signal to actuate the operating means and move the separable contact means to the open position thereof. A closing means produces a close signal, and a close actuator means employs the close signal to actuate the operating means and move the separable contact means to the closed position thereof. The tripping means includes means for selectively enabling and disabling the close actuator means as a function of the at least one signal corresponding to the at least one electrical condition of the separable contact means.

Preferably, the means for selectively enabling and disabling the close actuator means includes means for disabling the close actuator means after the tripping means produces the trip signal, and means for enabling the close actuator means after the means for disabling disables the close actuator means. The means for selectively enabling and disabling the close actuator means may also include at least one predetermined setting corresponding to the at least one electrical condition, and means for selectively enabling the close actuator means in response to the at least one predetermined setting.

As a further refinement the means for selectively enabling and disabling the close actuator means further includes means for adjusting the at least one predetermined setting. The at least one predetermined setting may include a first state for enabling the close actuator means and a second state for disabling the close actuator means.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

Figure 1:
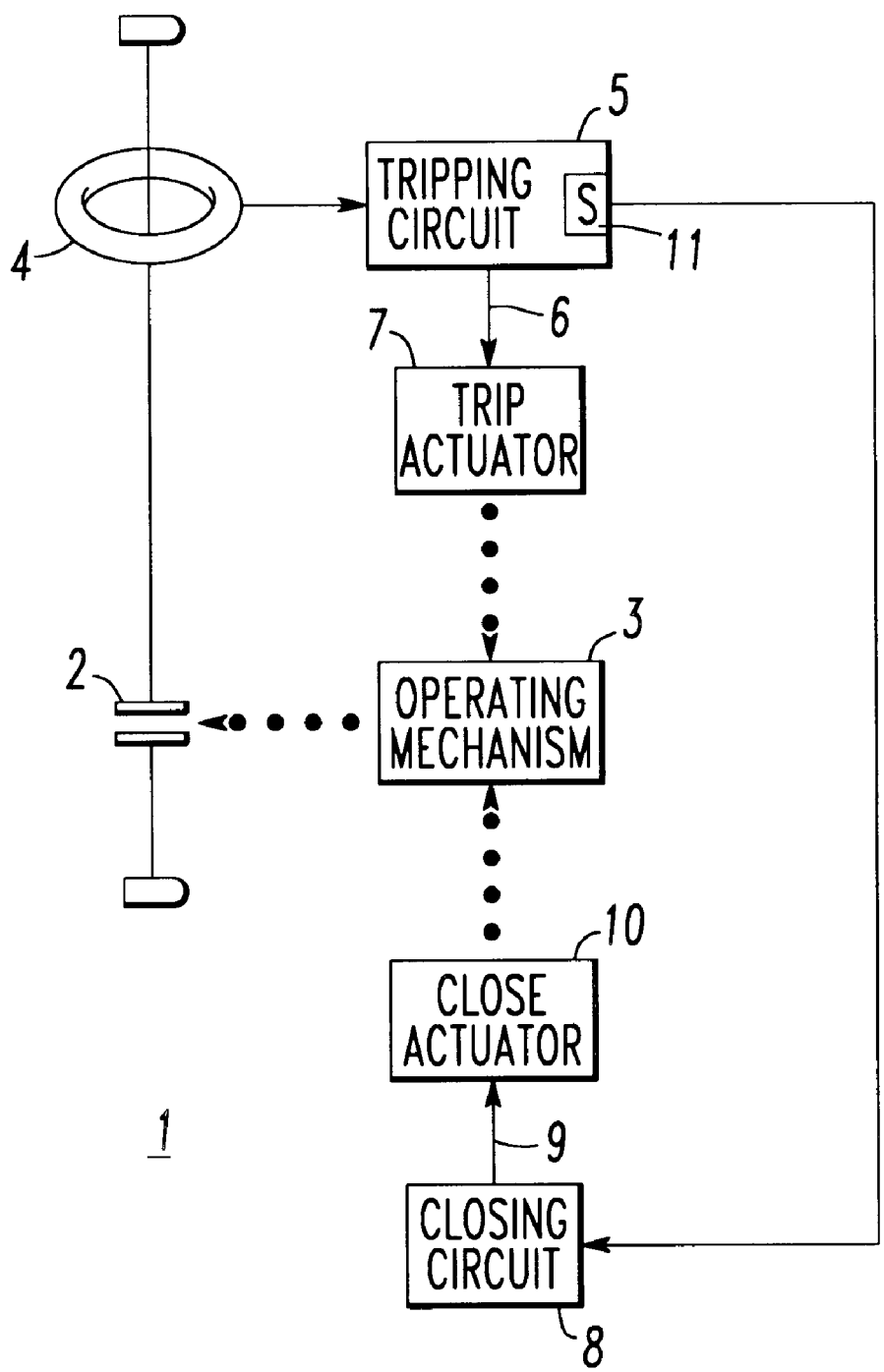
FIG. 1 is a simplified block diagram of a circuit breaker in accordance with the invention.

Referring to FIG. 1, a simplified block diagram of a circuit breaker 1 is illustrated. Although the exemplary circuit breaker 1 is disclosed, it will be appreciated that the invention is applicable to a wide variety of electrical switching devices. The circuit breaker 1 includes separable contacts 2 for movement between a closed position (not shown) and an open position. An operating mechanism 3 moves the separable contacts 2 between the closed and open positions. A sensing mechanism, such as the exemplary current transformer 4, senses an electrical condition of the separable contacts 2, such as current flowing between a power source (not shown) and a load (not shown), and produces a sensed current signal corresponding to that current condition.

A tripping circuit 5 of the circuit breaker 1 employs the sensed current signal and produces a trip signal 6. In turn, a trip actuator mechanism 7, such as a trip solenoid, employs the trip signal 6 to actuate the operating mechanism 3 and move the separable contacts 2 to the open position. A closing circuit 8 produces a close signal 9. A close actuator mechanism 10, such as a close coil, employs the close signal 9 to actuate the operating mechanism 3 and move the separable contacts 2 to the closed position. The tripping circuit 5 includes a circuit (S) 11 for selectively enabling and disabling the close coil 10.

Figure 2:
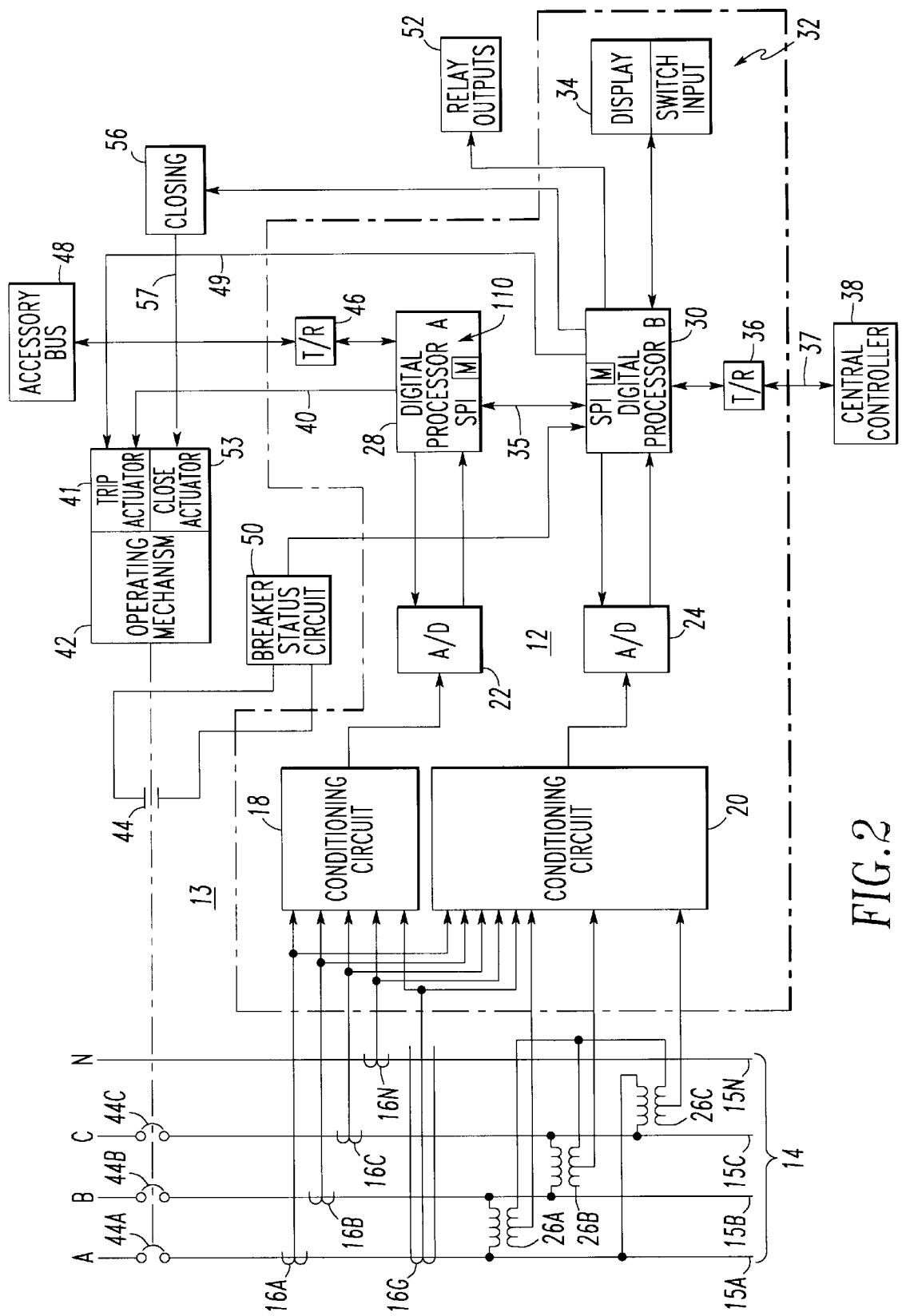
FIG. 2 is a schematic diagram, primarily in block form, illustrating a circuit breaker in accordance with another embodiment of the invention.

FIG. 2 illustrates an exemplary electronic trip unit 12 and circuit breaker 13 in accordance with the invention and in combination with ancillary components used for protection in an exemplary AC electrical power distribution system 14, which represents the load. The exemplary power system 14 has three phase conductors 15A,15B,15C, and a neutral conductor 15N, although the invention is applicable to any number of phases, with or without the neutral conductor. Current transformers 16A, 16B, 16C, and 16N, respectively, sense current flowing in each of these conductors. Current transformer 16G is a zero sequence transformer which indirectly measures ground current by directly measuring the sum of the phase and neutral currents.

The sensed current signals are suitably conditioned by conditioning circuits 18 and 20 which prepare those signals for processing by analog-to-digital (A/D) converters 22 and 24, respectively. Phase-to-phase voltages are also sensed from the three phase conductors 15A, 15B, 15C by potential transformers 26A,26B,26C, respectively, and the sensed voltage signals are input to conditioning circuit 20 for subsequent conversion by A/D converter 24. Preferably, the conditioning circuits 18 and 20 scale the sensed current and voltage signals to a suitable range for conversion by the A/D converters 22 and 24 for input to microprocessors (A) 28 and (B) 30, respectively.

In the preferred embodiment, the conditioning circuits 18,20, the A/D converters 22,24, and the microprocessors 28,30, are integrated in two microcomputers, such as a SURE CHIP PLUS™, as disclosed in U.S. Pat. No. 5,270,898, which is incorporated by reference herein. Although two microprocessors or microcomputers are shown, it will be appreciated that the invention is applicable to electrical switching devices having one, three or more processors, or other logic, to provide the trip function.

The exemplary A/D converter 24 samples analog voltages and currents at sampling instances determined by interrupts generated by the microprocessor 30 in a manner more particularly described in U.S. Pat. No. 5,600,527, and the patents referenced therein. The exemplary microprocessor 30 utilizes the data generated by the digital samples to provide voltage based protection functions such as, for example, under/over voltage protection for the power system 14.

Figure 6:
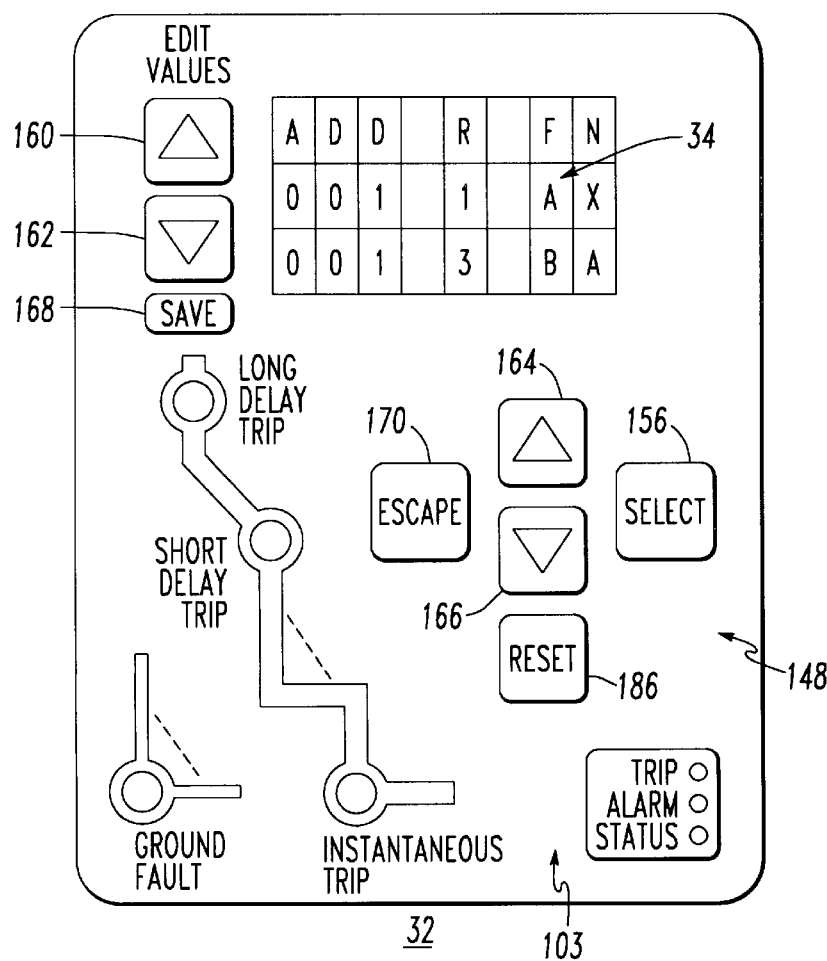
FIG. 6 is a simplified perspective view of a display and switch input panel of the circuit breaker of FIG. 2.

The microprocessor 30 communicates with an exemplary display and switch input panel 32 more fully illustrated in FIG. 6. The panel 32 serves as an exemplary interface with a user, although a wide range of alternative user-interfaces are possible. In the exemplary embodiment, the user controls the operation of the circuit breaker 13 through the panel 32 and, also, monitors the power system 14. To this end, the panel 32 has a display 34 on which power system information can be presented to the user. The panel 32 may also be used to input various settings (e.g., circuit breaker protection setpoints, other configuration settings for the trip function).

The microprocessors 28,30 communicate with one another through a serial peripheral interface (SPI) link 35 which also allows, for example, communication between microprocessor 28 and panel 32. The SPI link 35 is described in U.S. Pat. No. 5,270,898. The other microprocessor 30 communicates with a remote processor using a communication link, such as the exemplary transceiver (T/R) 36. The transceiver 36 enables the circuit breaker 13 to provide information to and be controlled over a network interface 37 by a remote processor, such as a central controller or host computer network station 38. A suitable central controller and network that may be employed for this purpose is described in U.S. Pat. No. 5,420,799. Central control networks of that type typically communicate over a common bus using a digital, asynchronous communication protocol.

In the exemplary embodiment, the various processing functions are split between the microprocessors 28,30. In this manner, monitoring, voltage based protection, and metering functions and algorithms that need to be processed over the normal operating range of the power system 14 are managed by the second microprocessor 30, while the overcurrent trip related functions are handled by the first microprocessor 28. Preferably, the microprocessors 28,30 are optionally powered from an auxiliary power source (not shown), independent from the three phase conductors 15A, 15B, 15C, such that auxiliary power to these microprocessors is maintained in the event of a line disturbance or trip condition.

The first microprocessor 28 operates in an overcurrent protection mode to generate a trip signal 40 when any one of the current/time characteristics of a delayed trip protection function is exceeded. This trip signal 40 is passed to a trip actuator (TA), such as a trip solenoid 41. The exemplary trip solenoid 41 includes a solenoid having a non-latching tripping coil (not shown) and an armature (not shown) which engages a switching device, formed by an operating mechanism 42 and separable contacts 44A,44B,44C, to open these separable contacts.

The transformers 16A,16B,16C,16N, 16G and 26A,26B, 26C sense current, voltage and frequency conditions of the conductors 15A, 15B, 15C and, thus, of the separable contacts 44A,44B,44C in those conductors. The trip solenoid 41 also employs the trip signal 40 to open the separable contacts 44A,44B,44C for an instantaneous overcurrent trip function. The operating mechanism 42 is typically a mechanically latched electronically released mechanism. Although typically not provided in the United States, additional separable contacts may be included to interrupt current in the neutral conductor 15N.

The first microprocessor 28 communicates through a second transceiver (T/R) 46 to an accessory bus network 48. The second microprocessor 30 communicates with the trip solenoid 41 through a second trip signal 49 which is also employed to open the separable contacts 44A,44B,44C. Accordingly, the exemplary trip solenoid 41 employs a trip signal formed by signals 40,49 to actuate the operating mechanism 42 as a function of various sensed electrical conditions and corresponding predetermined settings, such as operating values, in order to open the separable contacts 44A,44B,44C.

The overcurrent protection mode of the first microprocessor 28 generates the trip signal 40 in response to various current conditions including, for example, long delay trip, short delay trip, instantaneous trip, ground fault trip, neutral ampere trip, and amperes out of balance trip. This microprocessor 28 also generates alarms (e.g., by employing the accessory bus 48) in response to other current conditions including, for example, long delay pickup alarm, ground alarm, neutral ampere alarm, and high load alarm.

The voltage protection mode of the second microprocessor 30 generates the trip signal 49 in response to various voltage conditions (e.g., under voltage trip, over voltage trip, reverse phase sequence trip, phase loss trip), various frequency conditions (e.g., under frequency trip, over frequency trip), and various power conditions (e.g., reverse power trip). This microprocessor 30 also generates alarms (e.g., by employing the SPI link 35, microprocessor 28, and accessory bus 48) in response to other voltage and frequency conditions (e.g., under voltage alarm, over voltage alarm, under frequency alarm, over frequency alarm).

The second microprocessor 30 monitors auxiliary contacts 44 on the circuit breaker 13 through a breaker status circuit 50 to indicate the breaker's open/closed condition. This microprocessor 30 also communicates with relay outputs 52 that provide local breaker status information (e.g., high load, ground fault) to a remote location.

In the exemplary embodiment, the first microprocessor 28 performs overcurrent protection, trips the circuit breaker during overload and fault conditions, communicates with the second microprocessor 30 through the SPI link 35, and serves as the master device for the accessory bus 48. The second microprocessor 30 provides metering and voltage based protection, monitors circuit breaker status, controls output relays, interfaces with the user by way of the panel 32, performs voltage and/or frequency protection or tripping upon a request from the central controller 38, communicates with the microprocessor 28 through the SPI link 35, and remotely communicates with the central controller 38 which serves as a master device to the circuit breaker 13. Either microprocessor 28 or 30 can trip the circuit breaker 13 should the information shared over the SPI link 35 indicate that either or both microprocessors detect a problem.

Figure 3:
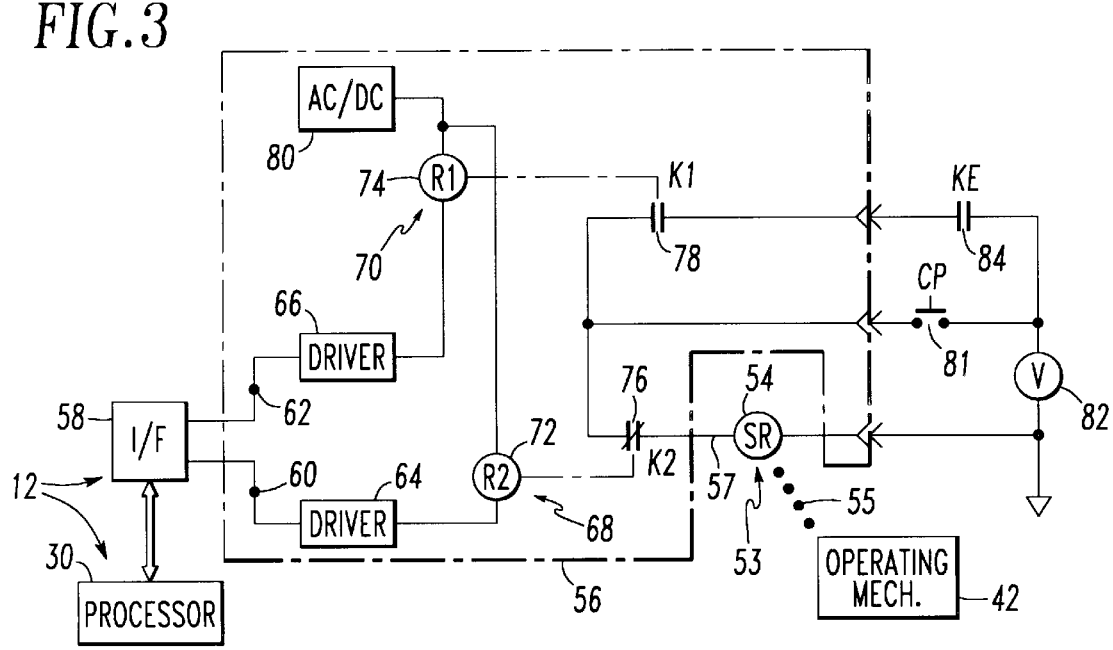
FIG. 3 is a block diagram of the closing circuit, close actuator and trip unit of FIG. 2 along with various external or remote closing permissive circuits.

Referring to FIGS. 2 and 3, a close actuator mechanism (CA) 53, such as a close relay, includes a solenoid having a closing coil (SR) 54 and an armature 55 engaging the operating mechanism 42 to move the separable contacts 44A,44B,44C to the closed position. A closing circuit 56 produces a close signal 57 to energize the closing coil 54. In the exemplary embodiment, the close signal 57 is produced from one or more internal and/or external sources such as, for example, the panel 32 and the central controller 38. When energized, the solenoid of the close actuator mechanism (CA) 53 releases a stored energy device (not shown), such as mechanically latched charged spring, of the operating mechanism 42 to close main contacts 44A,44B,44C.

As shown in FIG. 3, an interface (I/F) 58 to the microprocessor 30 provides a lockout signal 60 and a communication closing signal 62 to the closing circuit 56. Preferably, the microprocessor 30 receives a communication close command from the central controller 38 over the network interface 37 through the transceiver 36. Although an exemplary interface 58, which decodes certain processor address, data and/or control lines to latch and provide the signals 60,62, is illustrated, it will be appreciated that such signals may be directly provided by digital outputs of the processor. In turn, the signals 60,62 are input by suitable driver circuits 64,66 for relays 68,70, respectively. The relays 68,70 have coils 72 (R2) and 74 (R1) which drive a normally closed contact (K2) 76 and a normally open contact (K1) 78, respectively. When the signals 60,62 are active, the driver circuits 64,66 energize the relays 68,70, respectively, with current from AC/DC power supply 80.

When the contact (K2) 76 is closed, the closing coil (SR) 54 may be energized in two exemplary manners. First, the circuit breaker 13 of FIG. 2 is adapted to operate with an external or remote switch (CP) 81, such as a remote close push button. In that case, when the switch (CP) 81 is closed, the closing coil (SR) 54 is energized by current flowing from an external or remote voltage source 82. This current flows through switch 81 and through normally closed contact 76 which is in series with the closing coil (SR) 54.

The circuit breaker 13 is also adapted to operate with an external or remote permissive separable contact (KE) 84 having a closed position for energizing the closing coil (SR) 54 when the contact (K2) 76 is closed. In that case, with the contact (KE) 84 being closed, and with the normally open separable contact (K1) 78 being closed in response to the communication close command from the central controller 38, the closing coil (SR) 54 is energized by current flowing from voltage source 82, through contacts 84,78, and through normally closed contact 76. The contact (K1) 78 is in series with the closing coil (SR) 54 and has closed and open positions, as controlled by the communication closing signal 62, for respectively energizing and deenergizing that coil.

As discussed in greater detail below, the normally closed contact 76 may be advantageously controlled by the microprocessor 30 to block or disable closing and/or to enable closing under various trip and alarm conditions of the trip unit 12. The lockout signal 60, as output by the interface 58, has a first state for enabling the close signal 57 of the closing circuit 56 and a second state for disabling this close signal. The contact (K2) 76, as controlled by the lockout signal 60, has closed and open positions for respectively enabling and disabling the close signal 57.

Although an exemplary switch 81 and contact 84 are shown, it will be appreciated that a wide range of simple to complex, external or remote, control and/or permissive logic may be employed. As non-limiting examples, the switch 81 and contact 84 could be controlled by external or remote intelligence (e.g., a programmable logic controller), or could be replaced by one or two jumpers where appropriate precautions are undertaken. In addition, the external INCOM close command may be enabled or disabled by the firmware of the trip unit 12.

Figure 4:
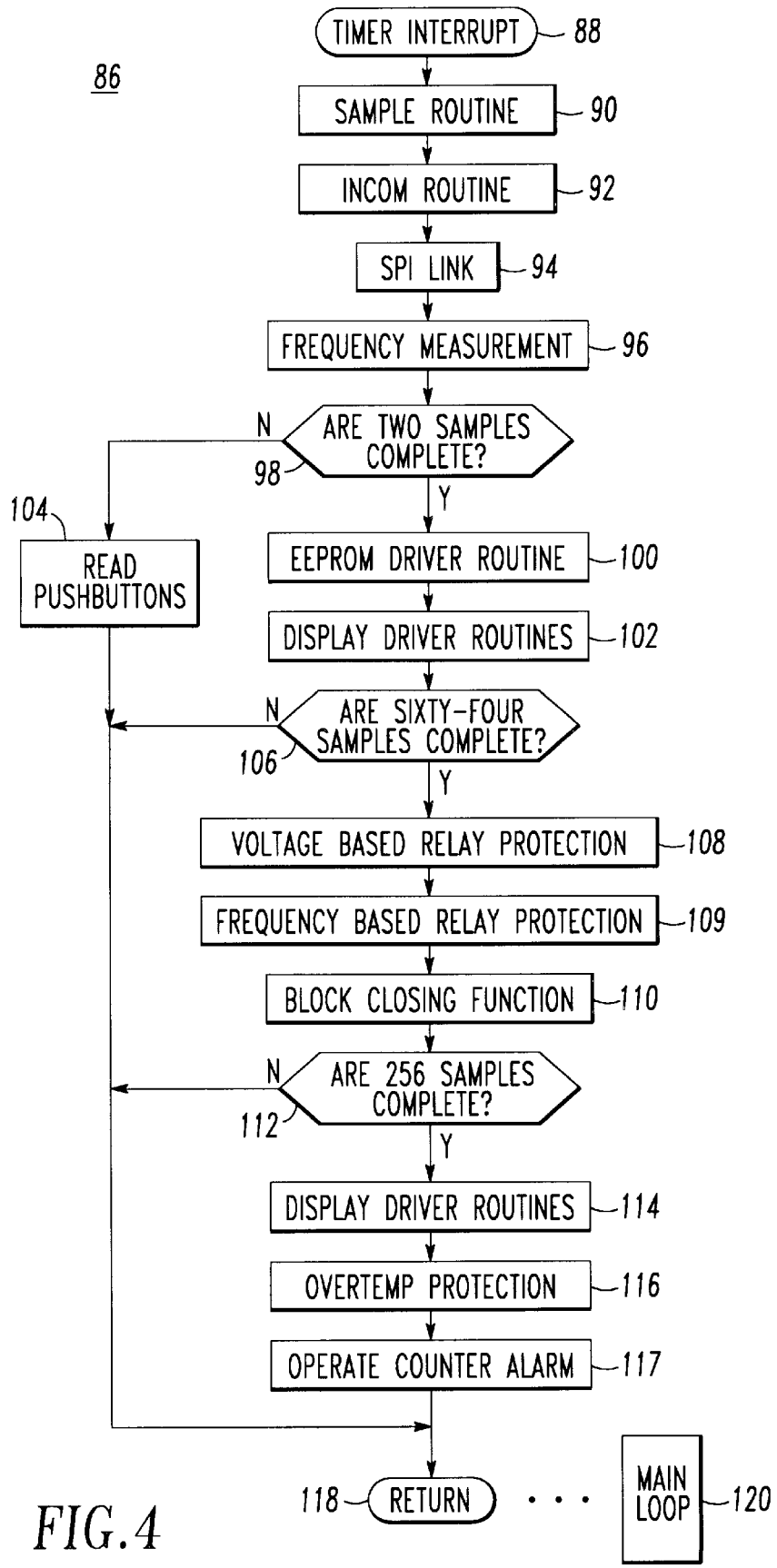
FIG. 4 is a flowchart of a timer interrupt firmware routine executed by the display microprocessor of FIG. 2.

FIG. 4 is a flowchart of a timer interrupt firmware routine 86 executed by the display microprocessor 30 of FIG. 2. The routine 86 starts at 88 in response to a timer interrupt. At 90, various currents and voltages are sampled from the A/D 24. Then, at 92, an INCOM routine is executed which services the INCOM communication transceiver 36. It is this routine which receives INCOM messages sent by central controller 38, including: (1) a first message which provides an external or remote reset signal to reset any present trip conditions; (2) a second message which provides an external or remote close signal to close normally open contact (K1) 78 of FIG. 3 and, thus, produce the close signal 57 when contacts 84 and 76 are also closed; and (3) a third message which provides an external or remote trip signal for an external communication trip. These three messages are processed as discussed below in connection with step 120. The capability for the user to issue the INCOM reset signal may be advantageously controlled by password protection at the central controller 38. In the event that the user cannot issue the reset signal, then the lockout condition would prevail at the remote location. Alternatively, the first and second messages may be combined in one INCOM command to provide an external or remote reset and close function in one message.

Next, at 94, information is obtained from the other microprocessor 28 over the SPI link 35 to indicate if that microprocessor has detected any trip or alarm conditions. Then, after various frequencies are measured at 96, it is determined whether two sets of current, voltage, and frequency samples are completed at 98. If so, then time critical control of the microprocessor's EEPROM (M) is conducted, as needed, at 100, and the display 34 is updated at 102. On the other hand, if two sets of current, voltage, and frequency samples are not complete at 98, then the push buttons 103 (shown in FIG. 6) of the panel 32 are read at 104 and corresponding values are stored in the random access memory (RAM) (not shown) of the microprocessor 30.

At 106, after 102, it is determined whether 64 sets of current, voltage, and frequency samples are completed. If so, then voltage based relay protection, including under voltage trip and over voltage trip, and under voltage alarm and over voltage alarm, is conducted at 108. Next, frequency based relay protection, including under frequency trip and over frequency trip, and under frequency alarm and over frequency alarm, is conducted at 109, after which a block closing function is executed at 110. It will be appreciated that steps 108 and 109, for example, provide the trip signal 49 to the trip solenoid 41 of FIG. 2 as a function of the sensed voltage and frequency conditions and corresponding predetermined values.

As discussed in greater detail below in connection with FIGS. 7 and 8, the block closing function 110 selectively enables and disables the close actuator mechanism 53 of FIGS. 2 and 3 in response to various predetermined settings corresponding to various current, voltage, frequency and other trip and alarm conditions of the trip unit 12. In particular, the block closing function 110 sets or resets the lockout signal 60 as a function of those predetermined settings and conditions.

Next, at 112, it is determined whether 256 sets of current, voltage, and frequency samples are completed. If so, then the display 34 is updated at 114 and over-temperature protection, including over temperature trip, is conducted at 116. Next, an operate counter alarm condition is detected at 117 based on the total number of trip operations produced by the microprocessors 28,30 as stored in their respective EEPROM (M) memories. Finally, the routine 86 returns at 118. Similarly, the routine 86 also returns after 104, and after 106 and 112 if 64 and 256, respectively, sets of samples are not complete.

After returning, execution resumes in a main loop 120 which includes various routines for servicing the display 34 of FIGS. 2 and 6, and the messages received through the INCOM communication transceiver 36. In response to one of the three messages discussed above in connection with step 92: (1) any present trip conditions are reset; (2) the communication close signal 62 of FIG. 3 is set to close contact (K1) 78; and (3) the trip signal 49 is asserted, respectively.

Figure 5:
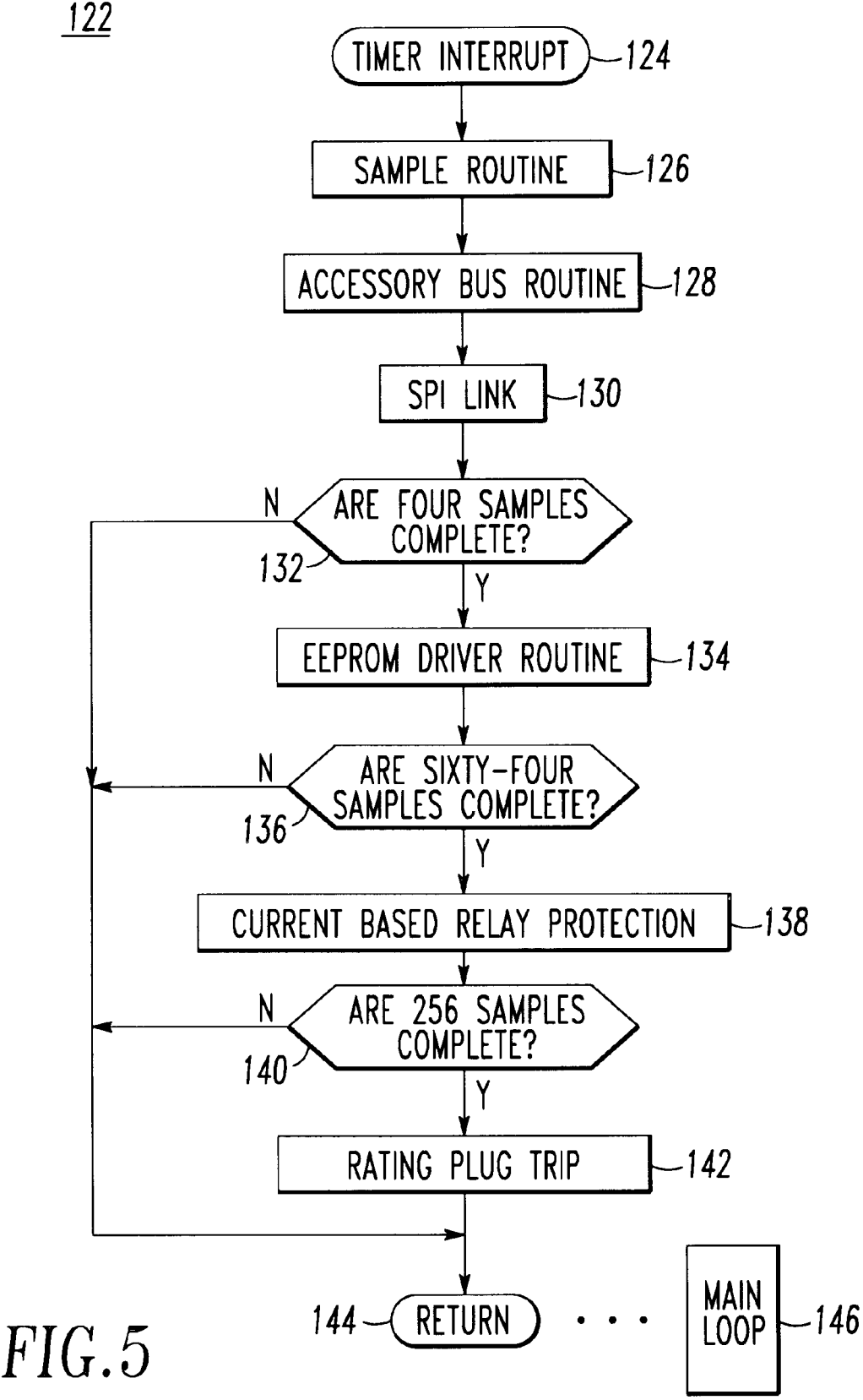
FIG. 5 is a flowchart of a timer interrupt firmware routine executed by the accessory bus microprocessor of FIG. 2.

FIG. 5 is a flowchart of a timer interrupt firmware routine 122 executed by the accessory bus microprocessor 28 of FIG. 2. The routine 122 starts at 124 in response to a timer interrupt. At 126, various currents are sampled from the A/D 22. Then, at 128, an accessory bus routine is executed which services the accessory bus transceiver 46. Next, at 130, information is provided to the other microprocessor 30 over the SPI link 35 to indicate if this microprocessor has detected any trip or alarm conditions. Then, at 132, it is determined whether four sets of current samples are completed. If so, then time critical control of the microprocessor's EEPROM (M) is conducted, as needed, at 134. On the other hand, if two sets of current samples are not complete at 132, then the routine 122 returns at 144.

Otherwise, at 136, it is determined whether 64 sets of current samples are completed. If so, then current based relay protection, including long delay trip, short delay trip, instantaneous trip, ground fault trip, neutral ampere trip, amperes out of balance trip, and long delay pickup alarm, ground alarm, neutral ampere alarm and high load alarm, is conducted at 138. It will be appreciated that step 138, for example, provides the trip signal 40 to the trip solenoid 41 of FIG. 2 as a function of the sensed current conditions and corresponding predetermined values.

Next, at 140, it is determined whether 256 sets of current samples are completed. If so, at 142, a test for a rating plug trip is conducted. Finally, the routine 122 returns at 144. Similarly, the routine 122 also returns after 136 and 140 if 64 and 256, respectively, sets of samples are not complete.

After returning, execution resumes in a main loop 146 which includes various routines for servicing the accessory bus transceiver 46. For example, in response to receiving a message to trip from the accessory bus 48, the trip signal 40 is asserted and an internal accessory bus trip flag is set for communication to the microprocessor 30 over SPI link 35.

Figure 7:
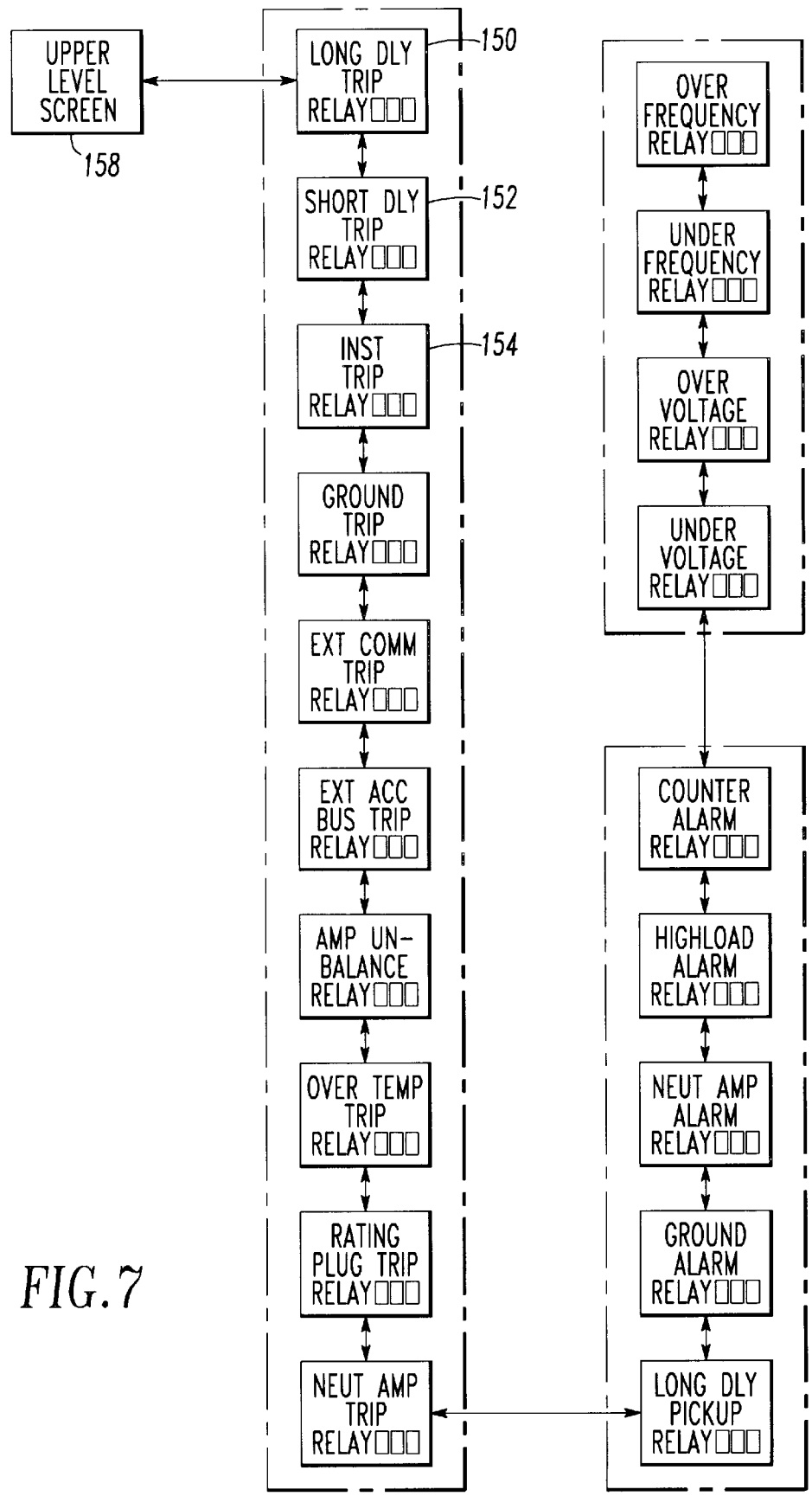
FIG. 7 is simplified sequence of display screens and keypad strokes employed by a user to program the settings for the block closing function of FIG. 4.

FIG. 7 is simplified sequence of screens of the panel display 34 of FIG. 6. These screens are employed to program or adjust the settings for the block closing function 110 of FIG. 4 and are accessed by the user through strokes of a keypad 148 of the panel 32. The user accesses various screens, such as 150,152,154, by first employing the SELect push button 156 from an upper level screen 158. The screen 150, for example, permits the user to program the block closing setting (e.g., on, off) for the LONG DELAY TRIP RELAY, which is controlled by step 138 of routine 122 of FIG. 5. At screen 150, the user toggles this block closing setting "on" or "off" with the edit value (↑) push button 160 or the edit value (↓) push button 162. Other screens, such as 152,154, permit the user to program the other block closing settings which correspond to the other trip and alarm conditions that are detected by the microprocessors 28,30.

As discussed below in connection with FIG. 8, resetting a block closing setting to "off" (i.e., non-blocking) will enable the closing circuit 56 of FIG. 3 to produce the close signal 57 to energize the closing coil 54 for the corresponding trip or alarm condition. On the other hand, setting a block closing setting to "on" (i.e., blocking) will disable the closing circuit 56 from producing the close signal 57 to energize the closing coil 54 for the corresponding trip or alarm condition.

The user navigates between the screens 150,152,154, for example, by employing the view up (↑) push button 164 (to go up to screen 152 from 154) and the view down (↓) push button 166 (to go down to screen 152 from 150). Once the settings are entered, they are loaded into the EEPROM (M) of the microcomputers 28,30 in response to the save push button 168. Finally, return to the upper level screen 158 from the screens 150,152,154 is accomplished through the ESCape push button 170.

Figure 8:
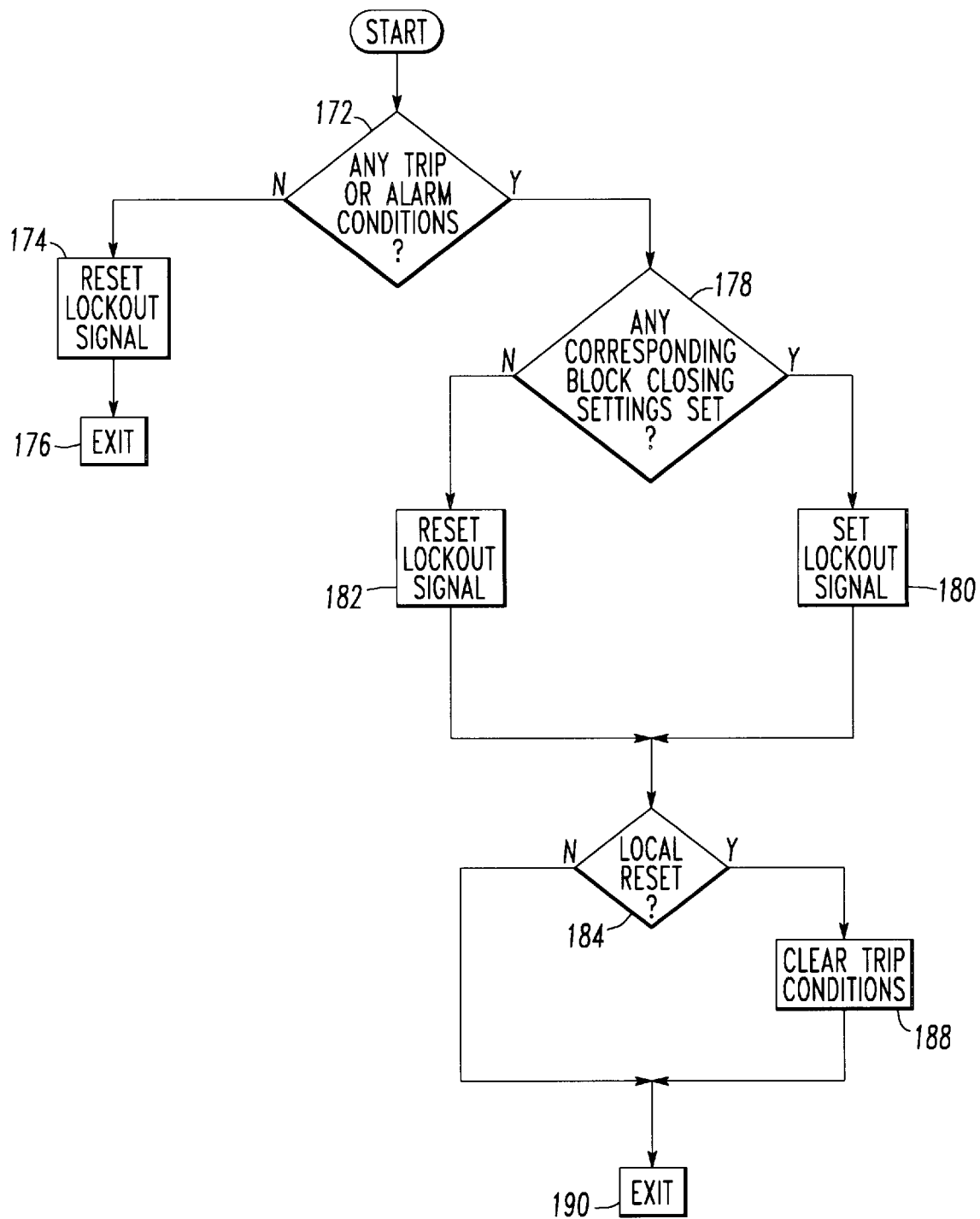
FIG. 8 is a flowchart of the block closing function of FIG. 4.

FIG. 8 is a flowchart of the block closing function 110. At 172, it is determined whether there are any active trip or alarm conditions by checking the internal trip and alarm flags as set by the microprocessors 28,30. If not, then, at 174, the lockout signal 60 of FIG. 3 is reset to deenergize relay 68 and, thus, close normally closed contact (K2) 76 before the function 110 exits at 176. On the other hand, if there are any active trip or alarm conditions, then, at 178, it is determined whether any of the corresponding predetermined block closing settings (for those active trip or alarm conditions) are "on" (i.e., blocking). If so, then, at 180, the lockout signal 60 of FIG. 3 is set to energize relay 68 and, thus, open contact (K2) 76 to disable the closing circuit 56 from producing the close signal 57. This deenergizes and disables the closing coil 54 after the trip unit 12 produces its trip (and/or alarm) signals.

Otherwise, if all of those corresponding predetermined block closing settings (for those active trip or alarm conditions checked at 172) are "off" (i.e., nonblocking), then, at 182, the lockout signal 60 of FIG. 3 is reset to deenergize relay 68 and, thus, close normally closed contact (K2) 76. This selectively enables the closing circuit 56 to produce the close signal 57 and energize the closing coil 54 (e.g., in response to external switch (CP) 81 of FIG. 3), thereby allowing a remote user to close the circuit breaker 13 without requiring a local reset thereof.

At 184, after either 180 or 182, it is determined whether a local reset push button 186 of the panel 32 of FIG. 6 was pressed as read by step 104 of routine 86 of FIG. 4 by checking the value stored in the RAM of the microprocessor 30. If so, then, at 188, any active trip conditions and the corresponding internal trip flags are cleared and, hence, for those blocking conditions, the closing coil 54 is selectively enabled after it was previously selectively disabled at 180. In a functionally similar manner, one of the three messages discussed above in connection with steps 92 and 120 of FIG. 4 may also be employed to externally or remotely reset any present trip condition. Finally, after 188, or after 184 if the local reset push button 186 was not pressed, the function 110 exits at 190.

In this manner, if one or more trip conditions and the corresponding block closing settings prevent a remote user from closing the circuit breaker 13 during the present execution of the block closing function 110, then, in the absence of one or more alarm conditions and their corresponding block closing settings, and under those same conditions, the closing circuit 56 of FIG. 3 would be enabled through contact 76 to produce the close signal 57 and energize the closing coil 54, and the remote user would be able to close the circuit breaker 13 during a subsequent execution of the block closing function 110.

The exemplary circuit breaker 13 permits the user to selectively configure certain trip and/or alarm conditions for which a reset command, either through the local panel 32 associated with the trip unit 12 or through the central controller 38, is not required. In this manner, the user may issue a remote close command to the circuit breaker 13 without being forced to locally reset the circuit breaker.

While specific embodiments of the invention have been described in detail, it will be appreciated by those skilled in the art, that various modifications and alternatives to those details could be developed in light of the overall teachings of the disclosure. Accordingly, the particular arrangements disclosed are meant to be illustrative only, and not limiting as to the scope of invention which is to be given the full breadth of the claims appended and any and all equivalence thereof.

What is claimed is:

1. An electrical switching apparatus comprising:

separable contact means for movement between a closed position and an open position, said separable contact means having at least one electrical condition;

operating means for moving said separable contact means between the closed position and the open position thereof;

sensing means for sensing said at least one electrical condition of said separable contact means and producing at least one signal corresponding to said at least one electrical condition;

tripping means employing said at least one signal corresponding to said at least one electrical condition for producing a trip signal;

trip actuator means employing the trip signal for actuating said operating means to move said separable contact means to the open position thereof;

closing means for producing a close signal; and close actuator means employing the close signal for actuating said operating means to move said separable contact means to the closed position thereof, with said tripping means including means for selectively enabling and disabling said close actuator means as a function of said at least one signal corresponding to said at least one electrical condition, said tripping means further including means for receiving a remote reset signal, said means for selectively enabling and disabling said close actuator means including means for disabling said close actuator means after said tripping means produces the trip signal, and means for enabling said close actuator means in response to the remote reset signal.

2. The electrical switching apparatus as recited in claim 1 wherein said means for enabling includes a push button.

3. The electrical switching apparatus as recited in claim 1 wherein said means for selectively enabling and disabling includes at least one predetermined setting corresponding to said at least one electrical condition, and means for selectively enabling said close actuator means in response to said at least one predetermined setting.

4. The electrical switching apparatus as recited in claim 3 wherein said means for selectively enabling and disabling includes an output with a signal having a first state for enabling the close signal of said closing means and a second state for disabling the close signal of said closing means, and also includes means for providing said output as a function of said at least one predetermined setting and said at least one electrical condition.

5. The electrical switching apparatus as recited in claim 4 wherein said means for selectively enabling and disabling said close actuator means further includes means for adjusting said at least one predetermined setting.

6. The electrical switching apparatus as recited in claim 4 wherein said at least one predetermined setting includes a first state for enabling said close actuator means and a second state for disabling said close actuator means.

7. The electrical switching apparatus as recited in claim 1 wherein said at least one electrical condition includes at least one current condition which is selected from the group consisting of long delay trip, short delay trip, instantaneous trip, ground fault trip, neutral ampere trip, and amperes out of balance trip.

8. The electrical switching apparatus as recited in claim 1 wherein said at least one electrical condition includes at least one voltage condition which is selected from the group consisting of under voltage trip, and over voltage trip.

9. The electrical switching apparatus as recited in claim 1 wherein said at least one electrical condition includes at least one frequency condition which is selected from the group consisting of under frequency trip, and over frequency trip.

10. The electrical switching apparatus as recited in claim 1 wherein said tripping means further includes means for producing the trip signal from another trip condition which is selected from the group consisting of external communication trip, external accessory bus trip, over temperature trip, and rating plug trip.

11. The electrical switching apparatus as recited in claim 1 wherein said close actuator means includes a solenoid having a closing coil and an armature engaging said operating means to move said separable contact means to the closed position thereof.

12. The electrical switching apparatus as recited in claim 11 wherein said closing means includes a separable contact in series with said closing coil, said separable contact having a closed position for enabling the close signal of said closing means and an open position for disabling the close signal of said closing means.

13. The electrical switching apparatus as recited in claim 12 wherein said electrical switching apparatus is adapted to operate with a remote switch having a closed position for energizing said closing coil.

14. The electrical switching apparatus as recited in claim 11 wherein said means for receiving a remote reset signal of said tripping means includes communication network means for receiving an external close signal and the remote reset signal; and wherein said closing means includes a relay having a separable contact and a coil which is energized by the external close signal, with said separable contact in series with said closing coil, and with said separable contact having a closed position for energizing said closing coil and an open position for deenergizing said closing coil.

15. The electrical switching apparatus as recited in claim 14 wherein said separable contact is a first separable contact; and wherein said closing means includes a second separable contact in series with said closing coil and said first separable contact, with said second separable contact having a closed position for enabling the close signal of said closing means and an open position for disabling the close signal of said closing means.

16. The electrical switching apparatus as recited in claim 14 wherein said electrical switching apparatus is adapted to operate with an external separable contact having a closed position for energizing said closing coil.

17. The electrical switching apparatus as recited in claim 1 wherein said at least one electrical condition is a plurality of electrical conditions; wherein said at least one signal corresponding to said at least one electrical condition is a plurality of signals corresponding to said electrical conditions; wherein said tripping means employs said signals corresponding to said electrical conditions for producing the trip signal; and wherein said means for selectively enabling and disabling said close actuator means includes a plurality of predetermined settings corresponding to said electrical conditions, and means for selectively enabling and disabling said close actuator means in response to each of said settings.

18. The electrical switching apparatus as recited in claim 17 wherein said tripping means further includes means for producing a plurality of alarm conditions; wherein some of said predetermined settings correspond to said alarm conditions; and wherein said means for selectively enabling and disabling said close actuator means in response to each of said settings includes means for disabling said close actuator means in response to said predetermined settings corresponding to said electrical conditions and said alarm conditions.

19. The electrical switching apparatus as recited in claim 18 wherein said alarm conditions are selected from the group consisting of a current alarm condition, a voltage alarm condition, a frequency alarm condition, and an operate counter alarm condition.

20. The electrical switching apparatus as recited in claim 1 wherein said close signal is remote close signal; and wherein said means for receiving a remote reset signal of said tripping means includes communication network means for receiving said remote close signal and said remote reset signal.

21. The electrical switching apparatus as recited in claim 20 wherein said communication network means includes receiver means for receiving one message including said remote close signal and said remote reset signal.

* * * * *